US007731290B1

(12) United States Patent
Kurimoto

(10) Patent No.: US 7,731,290 B1
(45) Date of Patent: Jun. 8, 2010

(54) ARMREST AND VEHICLE SEAT INCLUDING THE SAME

(75) Inventor: Tomoyuki Kurimoto, Shizuoka (JP)

(73) Assignee: TS Tech Co., Ltd. (JP)

( * ) Notice: Subject to any disclaimer, the term of this patent is extended or adjusted under 35 U.S.C. 154(b) by 14 days.

(21) Appl. No.: 12/064,986

(22) PCT Filed: Aug. 28, 2006

(86) PCT No.: PCT/JP2006/316900

§ 371 (c)(1),
(2), (4) Date: Feb. 27, 2008

(87) PCT Pub. No.: WO2007/026660

PCT Pub. Date: Mar. 8, 2007

(30) Foreign Application Priority Data

Aug. 29, 2005 (JP) ............... 2005-248464

(51) Int. Cl.
*B60N 2/46* (2006.01)
(52) U.S. Cl. ............... 297/411.32; 297/411.3; 297/115; 297/117
(58) Field of Classification Search ............ 297/411.3, 297/411.32, 117, 115
See application file for complete search history.

(56) References Cited

U.S. PATENT DOCUMENTS

| 3,550,958 | A | * | 12/1970 | Krein | 297/411.32 |
| 4,159,145 | A | * | 6/1979 | Quakenbush | 297/411.32 X |
| 4,216,994 | A | * | 8/1980 | Benoit | 297/411.34 X |
| 5,104,191 | A | * | 4/1992 | Tame | 297/411.32 |
| 5,290,092 | A | | 3/1994 | Geer | |
| 5,320,414 | A | * | 6/1994 | Spykerman et al. | 297/411.32 |
| 5,597,209 | A | | 1/1997 | Bart et al. | |
| 6,217,119 | B1 | * | 4/2001 | Cook et al. | 297/411.32 |
| 6,467,847 | B2 | | 10/2002 | Bidare | |
| 6,471,297 | B1 | * | 10/2002 | Runde et al. | 297/411.32 |
| 7,004,546 | B1 | * | 2/2006 | Thisius et al. | 297/411.33 |
| 7,255,402 | B1 | * | 8/2007 | Haddad et al. | 297/411.32 |
| 7,438,318 | B2 | * | 10/2008 | Sano | 297/117 X |

FOREIGN PATENT DOCUMENTS

| CH | 660840 | A5 | * | 5/1987 | 297/411.32 |
| DE | 3512953 | A1 | * | 11/1986 | 297/411.32 |
| DE | 19751437 | | | 5/1999 | |
| JP | 06191338 | A | * | 7/1994 | 297/411.32 |
| JP | 2001 197958 | | | 7/2001 | |
| JP | 2001 314277 | | | 11/2001 | |
| WO | WO 2006/120527 | A1 | | 11/2006 | |

* cited by examiner

Primary Examiner—Rodney B White
(74) Attorney, Agent, or Firm—Schiff Hardin LLP

(57) ABSTRACT

An armrest is provided having sufficient area to support arms at a comfortable position. The armrest is capable of being stowed compactly to provide aisle width sufficient for passengers' walk-through, and also is capable of moved from its stowed position to its used position in a single motion. The armrest is mounted to a side portion of a seat back of a vehicle seat. The armrest includes an armrest main body and a pivot member supporting the armrest main body at the seat back side of the armrest main body. The armrest main body is pivotally attached to the side portion of the seat back via the pivot member, and the pivot member is skewed toward the vehicle rear at a substantial angle relative to a widthwise horizontal axis of the seat as it extends from a base to a distal end.

6 Claims, 7 Drawing Sheets

ARMREST AND VEHICLE SEAT INCLUDING THE SAME

BACKGROUND

The present invention relates to an armrest and a vehicle seat including the same, and is particularly related to a foldable armrest which is moveable between a raised position and a forward lowered position relative to a seat back and a vehicle seat including the same.

An armrest for a seat of a vehicle, for example an automobile, such as a foldable armrest 110 shown in FIG. 7, is known. This armrest 110 can be raised at the side of the seat back 120 when unused in order not to inhibit movement of passengers.

To move between the front and rear seating positions in a station wagon, passengers typically walk through an aisle between adjacent seats. However, when the aisle is narrow, the armrests obstruct the aisle and inhibit passengers' smooth walk-through.

In order to overcome this disadvantage, an armrest providing increased effective vehicle interior space by making an armrest storage compartment compact, is proposed (for example, in Japanese Patent Laid-Open No. 2001-314277 (page 7 and 8, FIGS. 2-4) (hereinafter, the '277 Patent)). While the armrest of the '277 Patent comfortably supports a passenger's arm in a used position, the armrest storage compartment becomes compact when the armrest is in an unused position, since the armrest can be folded toward the seat back and stowed upright at the side of the seat back. Therefore, the passengers' walk-through space between adjacent seats can be cleared when this type of armrest is used in a vehicle such as a station wagon.

According to the prior art disclosed in the '277 Patent, the armrest storage compartment becomes compact. However, this armrest requires a two-step operation of lowering the armrest to a horizontal position and rotating it before use. A need therefore exists to overcome this disadvantage.

SUMMARY

It therefore is an object of the present invention to provide an armrest having sufficient area to support arms, supporting arms at a comfortable position, and being stowed compactly to provide a sufficient aisle width for passengers' walk-through, and capable of returning from a stowed position to a used position in a single motion.

It is another object of the present invention to provide a vehicle seat including the above armrest.

To achieve the objects, according to one embodiment of the present invention, an armrest mounted to a side portion of a seat back of a vehicle seat, comprising an armrest main body, and a pivot member supporting the armrest main body at the seat back side of the armrest main body, wherein the armrest main body is pivotally attached to the side portion of the seat back via the pivot member, and wherein the pivot member is skewed toward the vehicle rear at a substantial angle relative to a widthwise horizontal axis of the seat as it extends from a base to a distal end, is provided.

As described above, according to the armrest for various embodiments of the present invention, the armrest main body is fixed to the side portion of the seat back via the pivot member, and the pivot member is skewed toward the vehicle rear at the substantial angle relative to the widthwise horizontal axis of the seat as it extends from the base to the distal end. Thus, when rotated at the seat back side, the armrest main body is at first positioned to extend in an outwardly diverging manner from the seat back as it extends from a base to a distal end in the used position, and the distal end approaches the side portion of the seat back and the armrest is finally stowed upright in the unused position.

Therefore, when unused, the armrest main body is stowed closer to the seat back such that the aisle width between adjacent seats is increased and the passengers' walk-through space is cleared.

In addition, the armrest main body does not approach a seating space too much so as to support a passenger's arm at a comfortable position.

More specifically, the side portion of the seat back preferably has a slant surface tilted inwardly at a substantial angle relative to a horizontal axis in a fore-aft direction of the vehicle as the slant surface extends from a front to a rear, the pivot member is preferably mounted to the slant surface so as to be positioned at a substantial angle relative to the slant surface such that an inner side of the armrest is approximately parallel to the slant surface when the armrest is raised.

Therefore, as when raised, the armrest main body moves toward a back side of the seat back and is positioned upright in close proximity to the slant surface, effective interior space is increased when the armrest main body is stowed.

In addition, by selecting the angle between the pivot member and the slant surface, the amount of travel to the used position of the armrest main body in a lateral direction and the positional relationship between the stowed armrest main body and the seat back can be adjusted.

Furthermore, if an angle between an axis of the pivot member and the slant surface is approximately 90 degrees, the armrest main body and the seat back can be located in close proximity to each other.

To achieve the objects, according to another embodiment of the present invention, an armrest mounted to a side portion of a seat back of a vehicle seat, comprising an armrest main body, and a pivot member supporting the armrest main body at the seat back side of the armrest main body, wherein the armrest main body is pivotally attached to the side portion of the seat back via the pivot member, and wherein the pivot member is skewed vertically upward at a substantial angle relative to a widthwise horizontal axis of the seat as it extends from a base to a distal end, is provided.

As described above, according to the armrest of various embodiments of the present invention, the armrest main body is fixed to the side portion of the seat back via the pivot member, and the pivot member is skewed vertically upward at the substantial angle relative to the widthwise horizontal axis of the seat as it extends from the base to the distal end. Thus, when rotated at the seat back side, the armrest main body is at first positioned to extend in an outwardly diverging manner from the seat back as it extends from a base to a distal end in the used position, and the distal end approaches the side portion of the seat back and the armrest is finally stowed upright in the unused position.

In addition, the armrest preferably comprises a surface approximately perpendicular to a vehicle floor opposite the seat back and a surface inclined toward the seat back when the armrest is raised at the side of the seat back, the surface inclined toward the seat back being on top of the surface approximately perpendicular. Therefore, when stowed at the side of the seat back, the armrest does not intrude into vehicle interior space and sufficient walk-through space is maintained.

Further, the side portion of the seat back is preferably tilted inwardly as it extends from a substantial center to an upper part in front view, wherein an inner side of the armrest is tilted along the side portion of the seat back. Therefore, when stowed upright at the seat back side, the armrest main body is raised to be positioned in close proximity to the slant surface of the seat back and sufficient walk-through space is maintained.

Furthermore, to achieve the objects, according to yet another embodiment of the present invention, a vehicle seat comprising any of the armrests prescribed above and the seat back the armrest mounted thereto, is provided.

According to the armrest and vehicle seat including the same of various embodiments of the present invention, with a simple structure that the pivot member holding the armrest main body at the seat back side is tilted, when stowed upright at the side of the seat back the armrest main body is positioned closer to the seat back. As a result, an aisle width between adjacent seats is increased and sufficient walk-through space is maintained in the vehicle.

Furthermore, since the armrest main body extends in an outwardly diverging manner from the seat in the used position, the armrest main body does not approach a seating space too much so as to have sufficient area to support arms and to be capable to support a passenger's arm at a comfortable position.

In addition, while the armrest according to various embodiments of the present invention has a space-saving design, the armrest is switchable between the stowed position and the used position in a single motion: more specifically, it is switchable to the used position simply by lowering the armrest main body and to the unused position simply by raising it. Therefore such an armrest is easy for passengers to use.

Furthermore, as the armrest comprises few parts so as to be easy to assemble, the number of assembling steps is decreased and manufacturing cost is reduced.

BRIEF DESCRIPTION OF THE DRAWINGS

The invention is illustrated below with reference to various embodiments shown in the drawings and described in more detail below.

DETAILED DESCRIPTION OF THE PREFERRED EMBODIMENTS

An embodiment of the present invention will be described with reference to the accompanying drawings. It is to be understood that the present invention is not limited to the specific construction and arrangement of parts described below, and variations may be made without departing from the spirit and scope of the invention.

FIGS. 1 through 5 illustrate an embodiment of the present invention.

Figure 1:
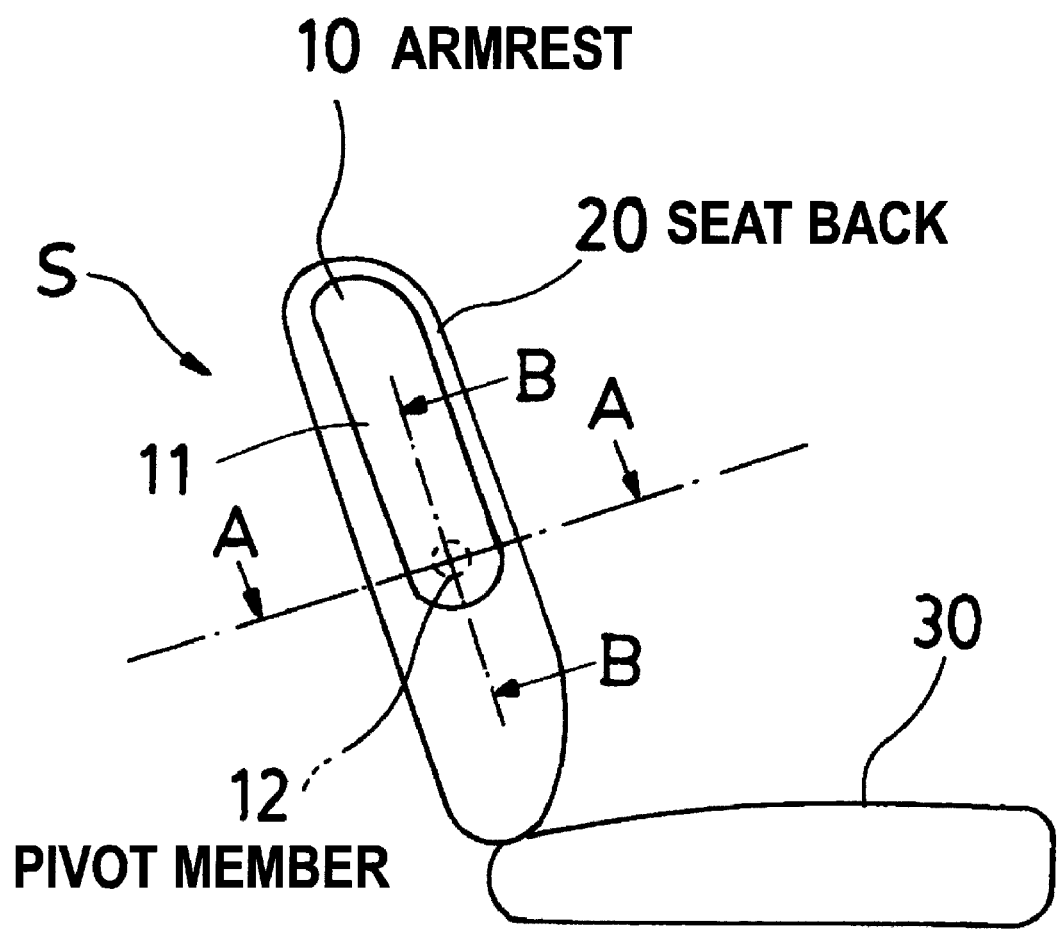
FIG. 1 is a pictorial view of an armrest and a seat according to and embodiment of the present invention.

FIG. 1 illustrates a seat S having an armrest 10 as viewed from the side. In FIG. 1 the armrest 10 is illustrated in a stowed position. Reference numeral 30 indicates a seat portion of the seat S.

The armrest 10 of this embodiment is mounted to a side portion of a seat back 20 of the seat S of an automobile. The armrest 10 comprises an armrest main body 11 and a pivot shaft 12 corresponding to a pivot member, and the armrest main body 11 is pivotally mounted to the seat back 20 via the pivot shaft 12.

Figure 2:
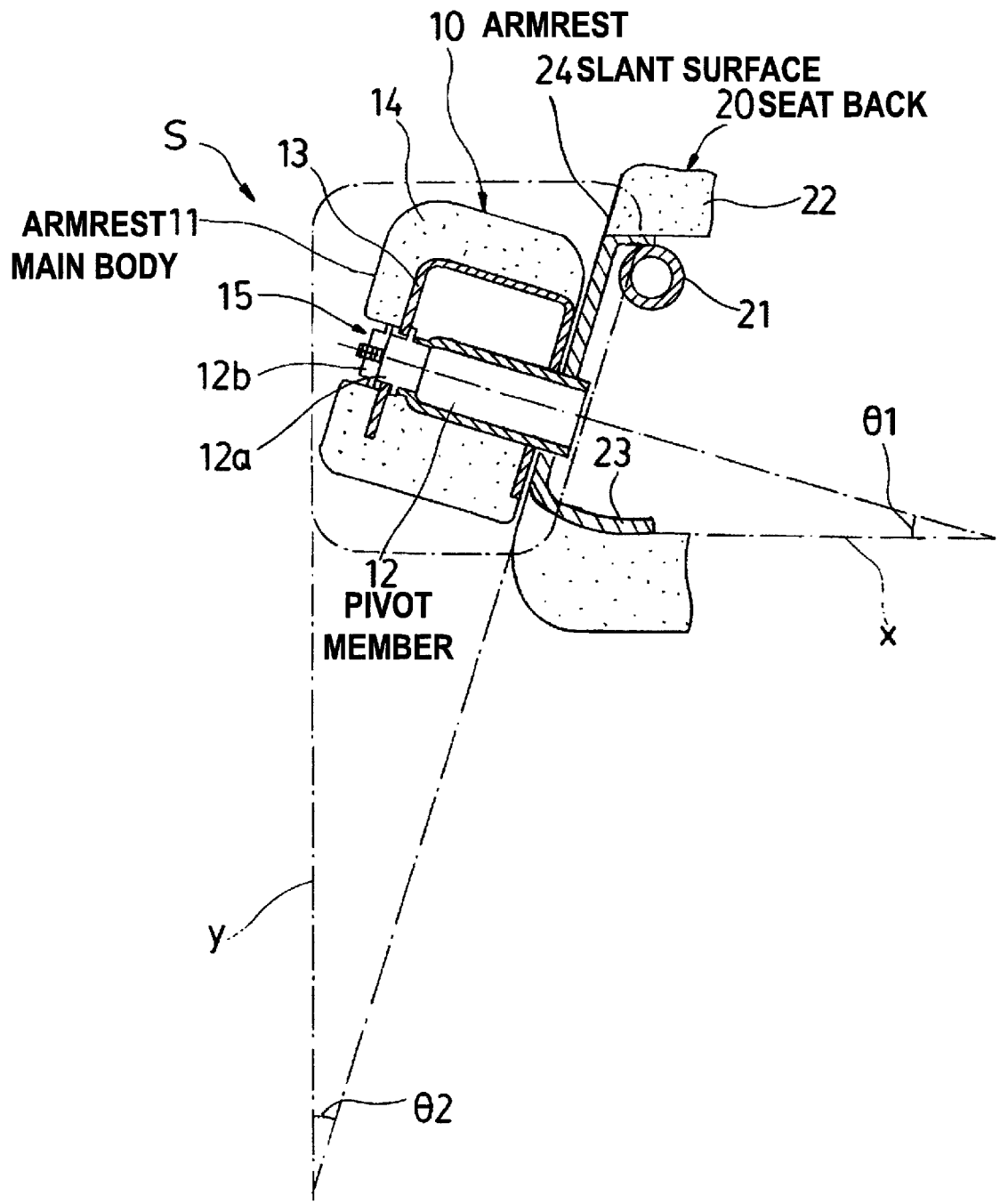
FIG. 2 is a sectional view taken along line A-A of FIG. 1.

FIG. 2 is a sectional view taken along line A-A of FIG. 1 illustrating the seat S and the armrest 10 as cut along line A-A and viewed from above. FIG. 2 illustrates the construction of the armrest 10 and its attachment to the seat back 20.

The armrest main body 11 comprises a frame 13 and a pad 14 integrally disposed to the frame 13. The outside of the pad 14 is covered with a skin member, not shown in FIG. 2.

The frame 13 and the pad 14 are formed with a hole 15. The hole 15 has a diameter sized to engage the pivot shaft 12. The armrest main body 11 is mounted to the seat back 20 via the pivot shaft 12.

The seat back 20 comprises a back frame 21, a pad 22 and a bracket 23 to which the armrest is mounted. The outside of the pad 22 is covered with a skin member, not shown in FIG. 2.

The pivot shaft 12 is secured to the bracket 23 and projects therefrom. The pivot shaft 12 is provided with a pivot part 12a engaged with the hole 15 of the armrest main body 11 at the distal end. The pivot part 12a is made of resin and structured such that the armrest main body 11 can smoothly slide and rotate around the pivot shaft 12. A nut 12b is screwed to a distal end of the pivot part 12a and secures the armrest main body 11 to the pivot shaft 12 so as to prevent the armrest main body 11 from falling out of the pivot shaft 12.

The lower side of FIG. 2 corresponds to the front side of the vehicle. As illustrated in the figure, the side portion of the seat back 20 has a slant surface 24 tilted at a substantial angle relative to a horizontal axis y in a fore-aft direction of the vehicle as the slant surface 24 extends from a front to a rear.

The pivot shaft 12 is mounted to the slant surface 24 so as to be positioned at a substantial angle relative to the slant surface 24 such that an inner side of the armrest 10 is approximately parallel to the slant surface 24 when the armrest 10 is raised. The pivot shaft 12 of this embodiment is positioned at an angle of approximately 90 degrees relative to the slant surface 24.

Regarding a positional relationship between the seat S and the pivot shaft 12, the pivot shaft 12 is skewed toward the vehicle rear at a substantial angle relative to a widthwise horizontal axis x of the seat S as it extends from a base to a distal end. The pivot shaft 12 of this embodiment is skewed horizontally at an angle 1 relative to the horizontal axis x.

The armrest main body 11 of this embodiment is mounted to the side portion of the seat back 20, and the pivot shaft 12 is tilted corresponding to the slant surface 24 of the side portion of the seat back 20. Thus when the armrest main body 11 is raised at the side of the seat back 20, the armrest main body 11 moves toward a back side of the seat back 20 and is positioned upright in close proximity to the slant surface 24.

The angle of the pivot shaft 12 relative to the slant surface 24 is not limited to 90 degrees; it may be another angle. By selecting the angle of the pivot shaft 12, the amount of travel to the used position of the armrest main body 11 in a lateral direction and the positional relationship between the stowed armrest main body 11 and the seat back 20 can be adjusted.

As the angle between the pivot shaft 12 and the slant surface 24 becomes more acute, that is, the angle 1 becomes greater, the armrest main body 11 extends in a more outwardly diverging manner from the seat S and a spacing between the armrest main body 11 and the seat S in the used position increases. At the same time the armrest main body 11 is positioned closer to the seat back 20 in the stowed position.

As the angle between the pivot shaft 12 and the slant surface 24 becomes more obtuse, that is, the angle 1 becomes smaller, the armrest main body 11 becomes closer to the seat S in the used position, and is raised further away from the seat back 20 in the stowed position.

Figure 3:
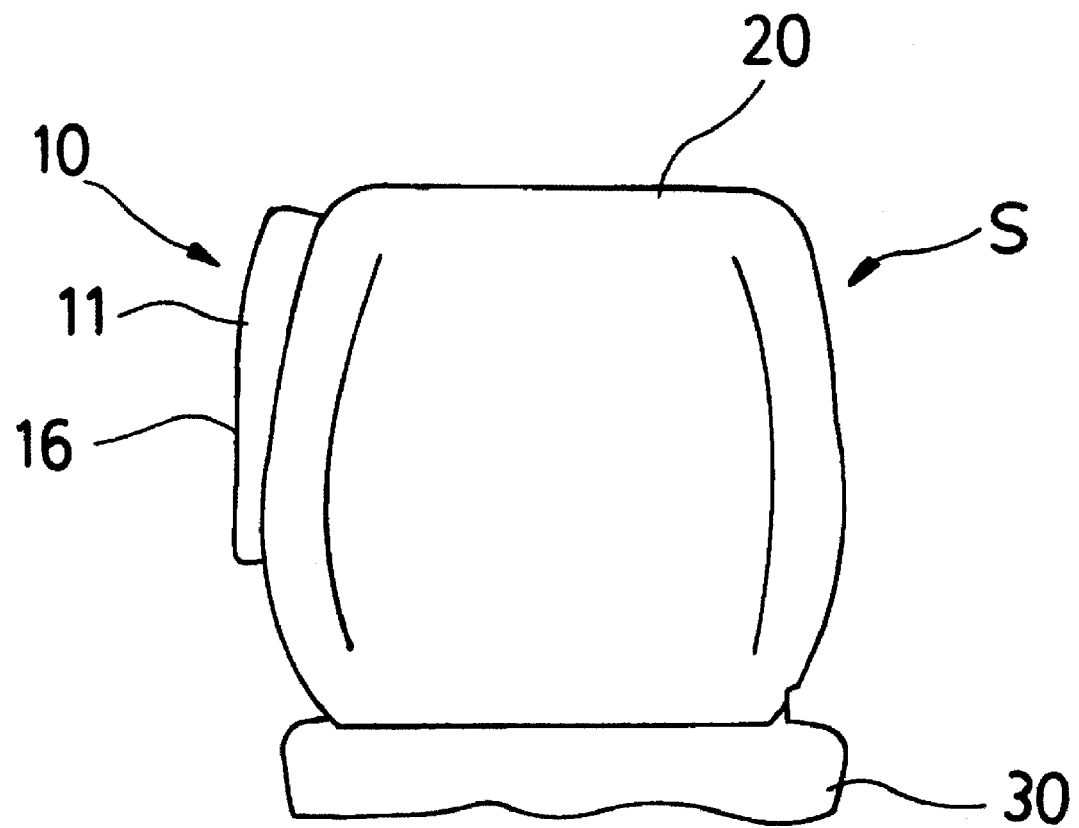
FIG. 3 is a front view of the armrest in an unused position and the seat.
Figure 4:
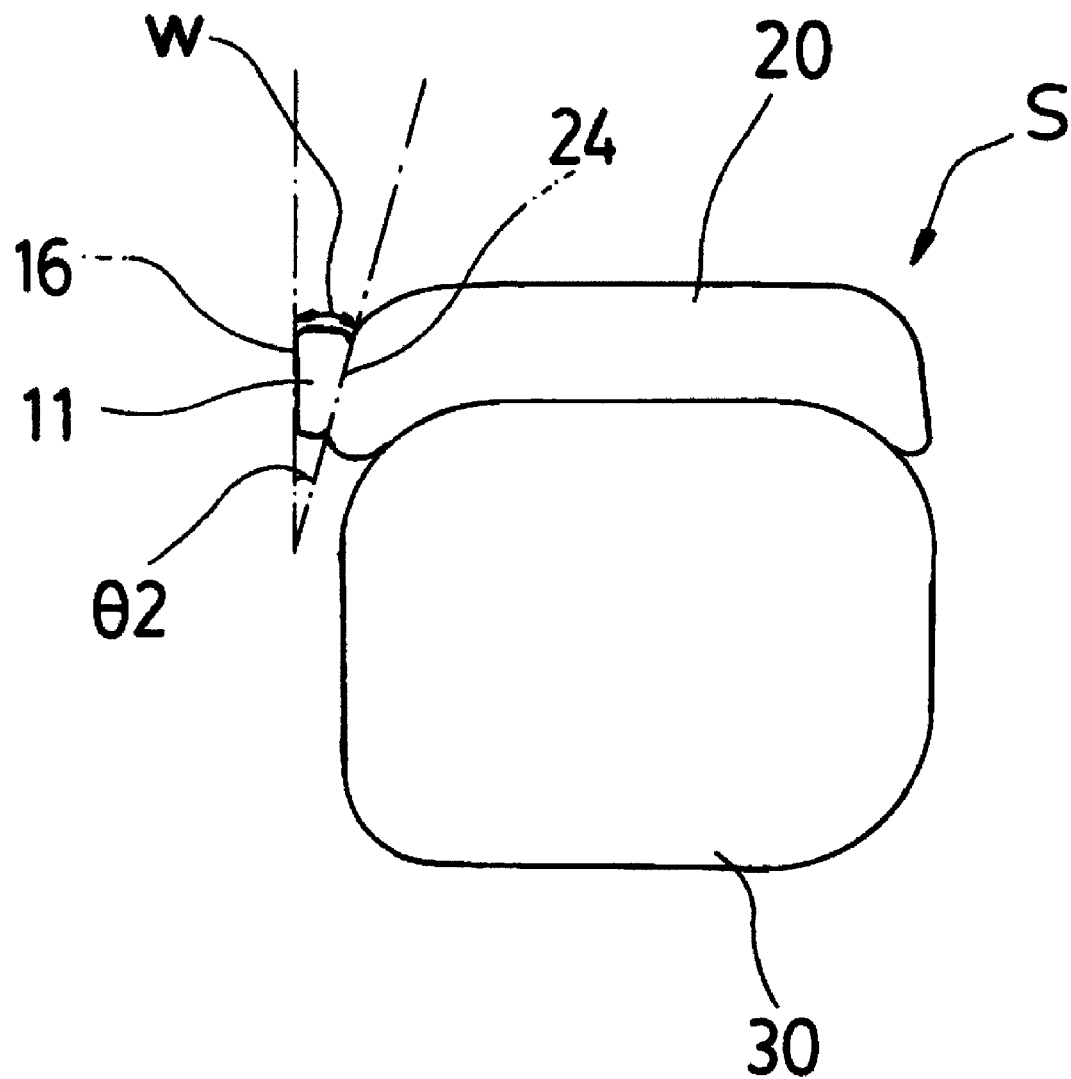
FIG. 4 is a plan view of the armrest in the unused position and the seat.
Figure 5:
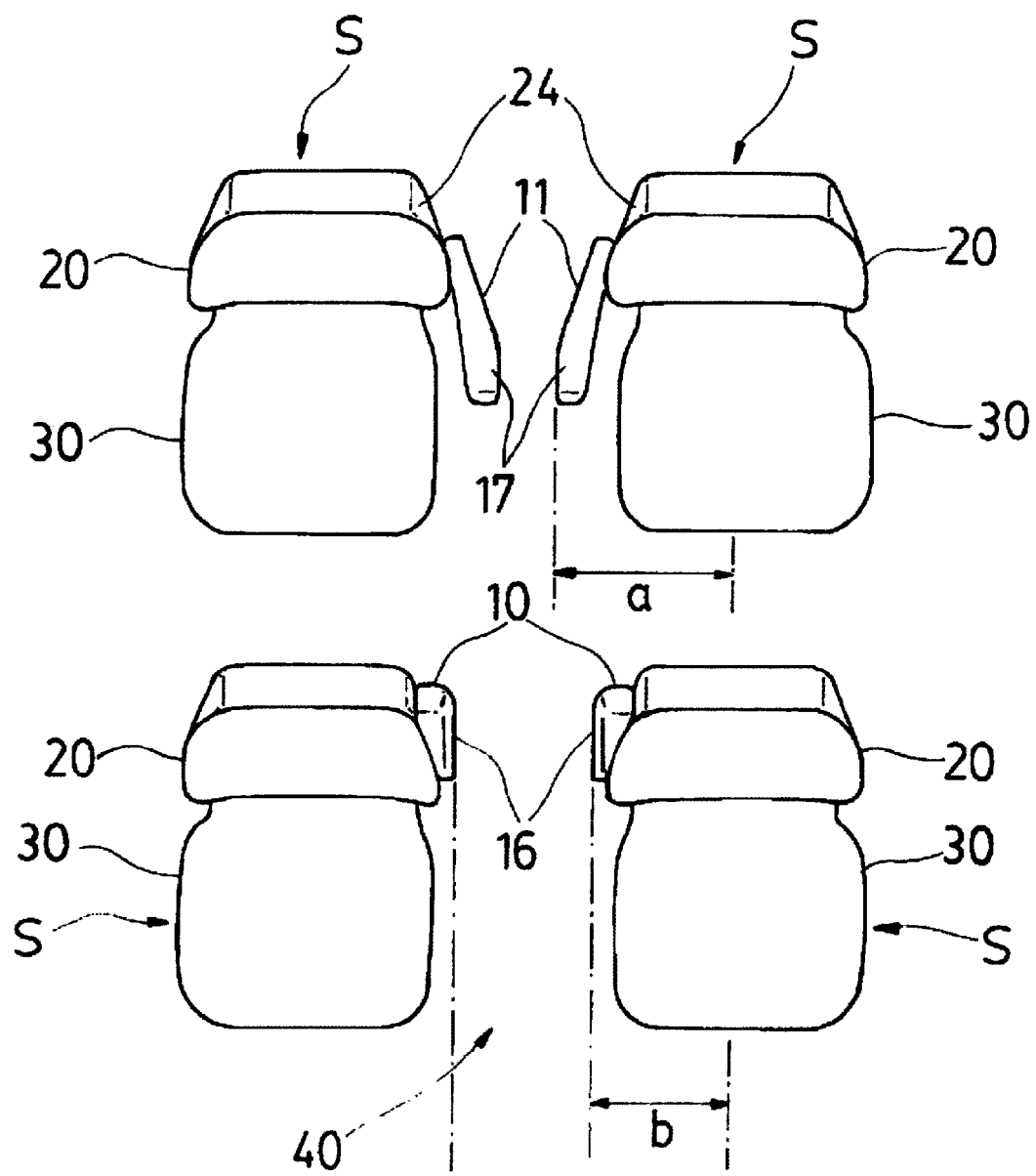
FIG. 5 is a pictorial view of the armrests in a used position and in the unused position and the seats.

FIGS. 3 through 5 illustrate the armrests 10 in the used position and in the unused position.

FIG. 3 illustrates the armrest 10 in the unused position; more specifically, it illustrates the armrest main body 11 being stowed upright at the side of the seat back 20. FIG. 3 illustrates the armrest 10 and the seat S viewed from the front of the vehicle.

As illustrated in the figure, the side portion of the seat back 20 is tilted inwardly as it extends from a substantial center to an upper part in front view, and an inner side of the armrest main body 11 is tilted along the side portion of the seat back 20. Thus, when stowed, the armrest main body 11 is positioned upright in close proximity to the side portion of the seat back 20.

The armrest main body 11 is formed such that a surface 16 thereof opposite the seat back 20 is approximately perpendicular to a vehicle floor when mounted to the side portion of the seat back 20. Therefore, when stowed at the side of the seat back 20, the armrest main body 11 does not intrude into vehicle interior space and sufficient walk-through space is maintained. The armrest main body 11 of this embodiment is formed such that a top of the surface 16 approximately perpendicular is inclined toward the seat back 20 to correspond with an exterior shape of the seat back 20 when mounted to the side portion of the seat back 20.

FIG. 4 illustrates the armrest main body 11 stowed at the side of the seat back 20, as viewed from above the seat S. A width w of the armrest main body 11 defines a width of a support surface for supporting a passenger's arm when the armrest 10 is in use. As the slant surface 24 of the seat back 20 becomes steeper, that is, the angle 2 becomes greater, the width w of the support surface of the armrest 10 becomes greater.

FIG. 5 is a pictorial view of the armrests 10 in the used position and in the unused position in the vehicle. In FIG. 5, the armrests 10 of rear seats are in the used position and the armrests 10 of front seats are in the unused position. The seat back 20 of the seat S of this embodiment comprises the slant surface 24, to which the pivot shaft 12 is mounted so as to be skewed toward the vehicle rear at the substantial angle relative to the widthwise horizontal axis of the seat S as the pivot shaft 12 extends from the base to the distal end, and via this pivot shaft 12 the armrest main body 11 is pivotally attached to the side portion of the seat back 20. Therefore, since the armrest main body 11 extends in an outwardly diverging manner from the seat S in the used position, the armrest main body 11 does not approach a seating space too much so as to support a passenger's arm at a comfortable position.

Reference numeral 17 in FIG. 5 indicates a support surface 17 on which a passenger puts his or her arm when the armrest 10 is used. The armrest main body 11 is formed such that the support surface 17 is positioned horizontally in the used position.

The armrest main body 11 is raised at the side of the seat back 20 when the armrest 10 is not used. In this case, since the armrest main body 11 is pivotally attached to the pivot shaft 12 being skewed toward the vehicle rear at a substantial angle relative to the widthwise horizontal axis of the seat S as the pivot shaft 12 extends from the base to the distal end, the armrest main body 11 moves toward the back side of the seat back 20 and is positioned in close proximity to the side portion of the seat back 20 and stowed.

Furthermore, since the armrest main body 11 is formed such that the surface 16 thereof opposite the seat back 20 is approximately perpendicular to the vehicle floor when mounted to the side portion of the seat back 20, the armrest main body 11 does not intrude into vehicle interior space. Therefore, the overall width of the seat back 20 is reduced and sufficient walk-through space 40 is maintained.

In this embodiment, as illustrated in FIG. 5, the distance between a center of the seat portion 30 and a lateral side of the armrest main body 11 is 331 mm (arrow a) in the used position of the armrest 10, and is 277 mm (arrow b) when the armrest 10 is stowed at the side of the seat back 20. Thus, the armrest 10 of this embodiment is stowed 54 mm more compactly in width in the stowed position than in the used position, and the width of the walk-through space 40 is 108 mm greater when both armrests 10 of adjacent seats are used than when they are stowed.

Figure 6:
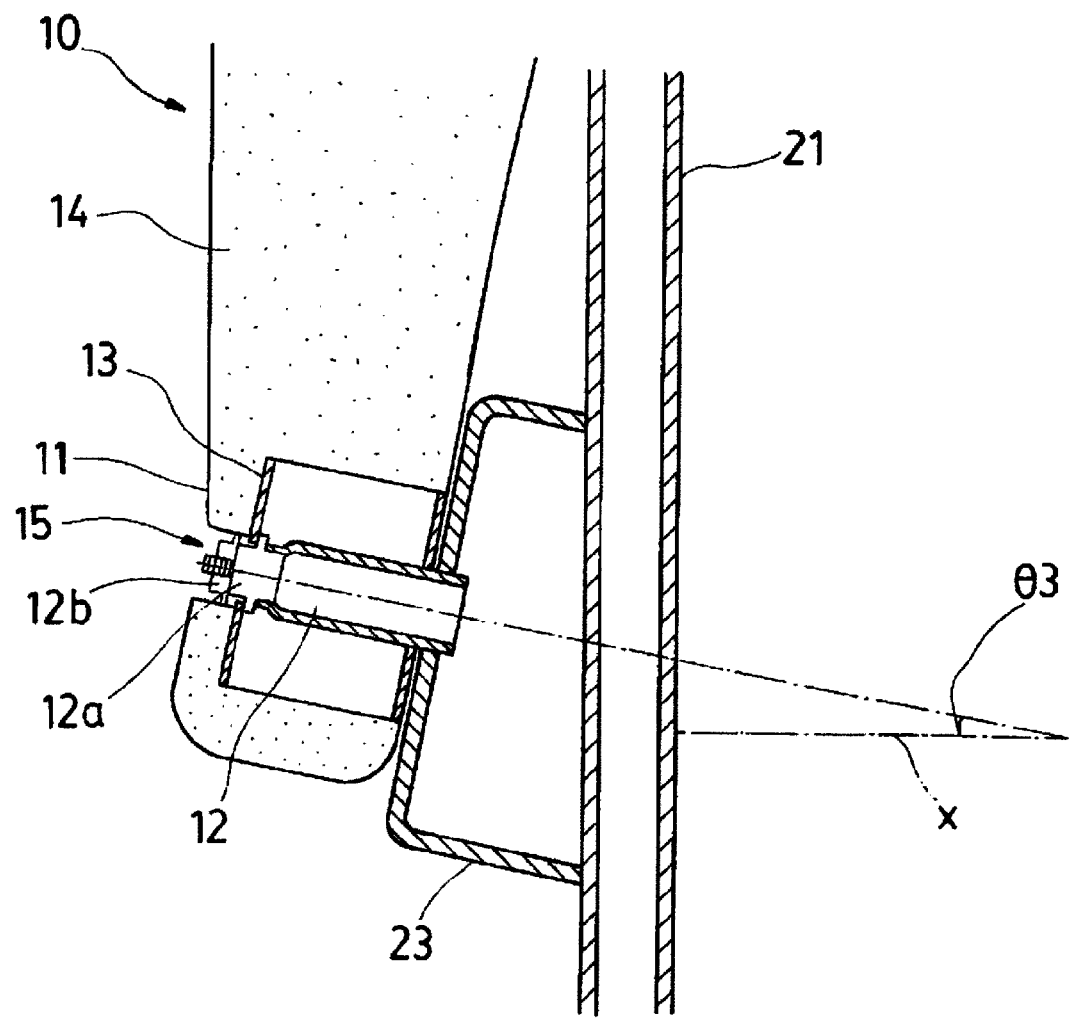
FIG. 6 is a sectional view of an alternative embodiment taken along line B-B of FIG. 1.
Figure 7:
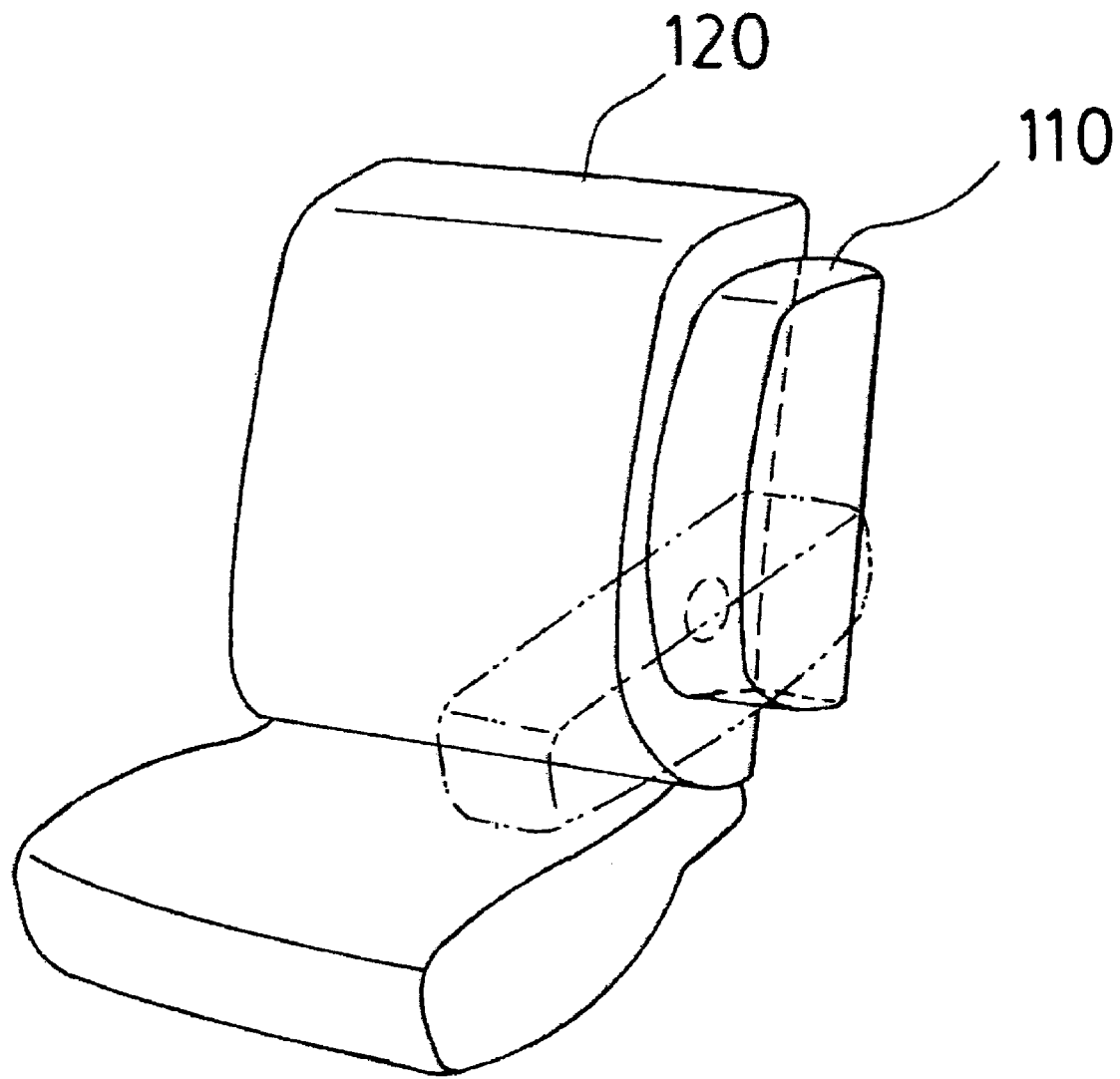
FIG. 7 is a pictorial view of a prior art embodiment.

FIG. 6 illustrates another embodiment. In this embodiment, the same or similar reference numerals are applied to the same or similar members and arrangements as or to the previous embodiment, and their description will be omitted or simplified.

FIG. 6 is a sectional view taken along line B-B of FIG. 1 as the seat S and the armrest 10 are cut along line B-B and viewed from the front. While the pivot shaft 12 of the previous embodiment is skewed horizontally at the angle 1 relative to the widthwise horizontal axis x of the seat as it extends from the base to the distal end, a pivot shaft 12 of this embodiment is skewed vertically upward at a substantial angle relative to the widthwise horizontal axis x of the seat as it extends from the base to the distal end.

More specifically, the pivot shaft 12 of this embodiment is mounted so as to be skewed at an angle 3 relative to the horizontal axis x, and the armrest main body 11 extends in an outwardly diverging manner from the seat S when in use. When the armrest main body 11 is being stowed, the armrest main body 11 moves toward the seat back 20 and is raised upright to be stowed in close proximity to the side portion of the seat back 20.

In this embodiment, the side portion of the seat back 20 is tilted inwardly as it extends from a substantial center to an upper part in front view such that the armrest main body 11 does not interfere with the side portion of the seat back 20 when raised.

Though the side portion of the seat back 20 has the slant surface 24 or is tilted inwardly from the substantial center to the upper part in front view in the embodiments described above, the seat back 20 may be configured to have no such slant surfaces. In this case, the armrest main body 11 is configured to have a shape that does not interfere with the side portion of the seat back 20 when raised.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

TABLE OF REFERENCE CHARACTERS

| | |
|---|---|
| 10 | armrest |
| 11 | armrest main body |
| 12 | pivot shaft (pivot member) |
| 12a | pivot part |
| 12b | nut |
| 13 | frame |
| 14 | pad |
| 15 | hole |
| 16 | surface |
| 17 | support surface |
| 20 | seat back |
| 21 | back frame |
| 22 | pad |
| 23 | bracket |
| 24 | slant surface |
| 30 | seat portion |
| 40 | walk-through space |
| S | seat |
| x | widthwise horizontal axis of the seat |
| y | horizontal axis in the fore-aft direction of the vehicle |
| 1, | angle between the widthwise horizontal axis of the seat and the pivot shaft |
| 2 | angle between the horizontal axis in the fore-aft direction of the vehicle and the slant surface of the seat back |

The invention claimed is:

1. An armrest mounted to a side portion of a seat back of a vehicle seat, comprising:
an armrest main body; and
a pivot member supporting the armrest main body at a seat back side of the armrest main body;
wherein the armrest main body is pivotally attached to the side portion of the seat back via the pivot member;
wherein the pivot member is skewed toward a seat rear area at a substantial angle relative to a widthwise horizontal axis of the seat as the pivot member extends from a base to a distal end;
wherein the side portion of the seat back has a slant surface tilted inwardly at a substantial angle relative to a horizontal axis in a fore-aft direction of the seat as the slant surface extends from a front to a rear; and,
wherein the pivot member is mounted to the slant surface so as to be positioned at a substantial angle relative to the slant surface such that an inner side of the armrest is approximately parallel to the slant surface when the armrest is raised.

2. The armrest according to claim 1, wherein an angle between an axis of the pivot member and the slant surface is approximately 90 degrees.

3. An armrest mounted to a side portion of a seat back of a vehicle seat, comprising:
an armrest main body; and
a pivot member supporting the armrest main body at a seat back side of the armrest main body;
wherein the armrest main body is pivotally attached to the side portion of the seat back via the pivot member;
wherein the pivot member is skewed toward a seat rear area at a substantial angle relative to a widthwise horizontal axis of the seat as the pivot member extends from a base to a distal end; and,
wherein the armrest comprises a first surface approximately perpendicular to a vehicle floor opposite the seat back and a second surface inclined toward the seat back when the armrest is raised at the side of the seat back, the second surface inclined toward the seatback being on top of the first surface approximately perpendicular.

4. The armrest according to claim 1, wherein the side portion of the seat back is angled inwardly toward the other side portion of the seat back as it extends from a substantial center to an upper part, wherein an inner side of the armrest is angled along the side portion of the seat back.

5. An armrest mounted to a side portion of a seat back of a vehicle seat, comprising:
an armrest main body; and,
a pivot member supporting the armrest main body at a seat back side of the armrest main body;
wherein the armrest main body is pivotally attached to the side portion of the seat back via the pivot member;
wherein the pivot member is skewed vertically upward at a substantial angle relative to a widthwise horizontal axis of the seat as the pivot member extends from a base to a distal end; and,
wherein the armrest comprises a surface approximately perpendicular to a vehicle floor opposite the seat back and a surface inclined toward the seat back when the armrest is raised at the side of the seat back, the surface inclined toward the seatback being on top of the surface approximately perpendicular.

6. An armrest mounted to a side portion of a seat back of a vehicle seat, comprising:
an armrest main body; and,
a pivot member supporting the armrest main body at a seat back side of the armrest main body;
wherein the armrest main body is pivotally attached to the side portion of the seat back via the pivot member;
wherein the pivot member is skewed vertically upward at a substantial angle relative to a widthwise horizontal axis of the seat as the pivot member extends from a base to a distal end; and,
wherein the side portion of the seat back is angled inwardly toward the other side portion of the seat back as it extends from a substantial center to an upper part, wherein an inner side of the armrest is angled along the side portion of the seat back.

* * * * *